(12) United States Patent
Castle et al.

(10) Patent No.: US 7,045,983 B2
(45) Date of Patent: May 16, 2006

(54) SYSTEM FOR CONTROLLING MOTOR SPEED BY ALTERING MAGNETIC FIELD OF THE MOTOR

(75) Inventors: Harold L. Castle, Dexter, MI (US); DeQuan Yu, Ann Arbor, MI (US); Stephen T. Kempfer, Canton, MI (US); Norman N. Krieger, Milford, MI (US); Paul E. Fisher, Dexter, MI (US); Sheven Sharp, Troy, MI (US); James L. Thompson, Ypsilanti, MI (US)

(73) Assignee: Ford Motor Company, Dearborn, MI (US)

(*) Notice: Subject to any disclaimer, the term of this patent is extended or adjusted under 35 U.S.C. 154(b) by 4 days.

(21) Appl. No.: 10/780,689

(22) Filed: Feb. 17, 2004

(65) Prior Publication Data
US 2005/0179413 A1 Aug. 18, 2005

(51) Int. Cl.
*H02P 6/00* (2006.01)
(52) U.S. Cl. .............. 318/268; 310/179; 310/180
(58) Field of Classification Search ............. 318/268; 310/179, 180, 181, 190, 191, 193
See application file for complete search history.

(56) References Cited

U.S. PATENT DOCUMENTS

| 3,753,068 A | 8/1973 | Walker, Jr. ............... 318/338 |
| 3,904,901 A * | 9/1975 | Renard et al. ............ 310/52 |
| 4,104,552 A * | 8/1978 | Tsergas ................. 310/156.12 |
| 4,149,114 A * | 4/1979 | Gorjan .................. 318/731 |
| 4,453,101 A * | 6/1984 | Nelson .................. 310/211 |
| 4,547,714 A * | 10/1985 | Muller ................. 318/254 |
| 4,782,257 A | 11/1988 | Secher et al. ............ 310/114 |
| 4,787,823 A * | 11/1988 | Hultman ................ 417/45 |
| 4,899,074 A * | 2/1990 | West .................. 310/154.27 |
| 4,940,035 A | 7/1990 | Waring ................. 123/497 |
| 5,135,353 A | 8/1992 | Westhoff et al. ............ 415/88 |
| 5,206,574 A | 4/1993 | Okamoto et al. ........... 318/800 |
| 5,337,030 A * | 8/1994 | Mohler ................. 310/156.37 |
| 5,505,180 A | 4/1996 | Otterman et al. .......... 123/497 |
| 5,579,738 A | 12/1996 | Frischmuth et al. ........ 123/497 |
| 5,672,925 A | 9/1997 | Lipo et al. ............... 310/154 |
| 5,715,797 A | 2/1998 | Minagawa et al. ........ 123/497 |
| 5,723,928 A | 3/1998 | Imai et al. ............... 310/114 |
| 5,825,113 A | 10/1998 | Lipo et al. ............... 310/181 |
| 6,047,104 A * | 4/2000 | Cheng .................. 388/835 |
| 6,085,599 A * | 7/2000 | Feller .................. 73/861.13 |
| 6,373,162 B1 * | 4/2002 | Liang et al. ............ 310/156.53 |
| 6,531,799 B1 | 3/2003 | Miller .................. 310/114 |
| 6,541,887 B1 | 4/2003 | Kawamura ............... 310/190 |

(Continued)

FOREIGN PATENT DOCUMENTS

JP 63001353 1/1988

*Primary Examiner*—Rita Leykin
(74) *Attorney, Agent, or Firm*—Mark S. Sparschu; MacMillan, Sobanski & Todd

(57) ABSTRACT

The present invention provides a system for controlling the speed of a motor by altering the magnetic field of the motor. The system includes field modification module, and a motor having field windings and a rotor. The field windings are configured to receive a driving signal that generates a magnetic field causing a rotation of the rotor. The field modification module is proximate the motor and alters the magnetic field in response to an input signal thereby controlling the speed and torque of the rotor.

14 Claims, 4 Drawing Sheets

U.S. PATENT DOCUMENTS

| | | | |
|---|---|---|---|
| 6,563,248 B1 | 5/2003 | Fujita | 310/181 |
| 6,639,338 B1 * | 10/2003 | Haner | 310/166 |
| 6,707,208 B1 * | 3/2004 | Durham et al. | 310/156.37 |
| 6,888,279 B1 * | 5/2005 | Haner | 310/166 |
| 2003/0102756 A1 * | 6/2003 | Kusase | 310/156.53 |
| 2004/0155551 A1 * | 8/2004 | Mawardi | 310/211 |

* cited by examiner

SYSTEM FOR CONTROLLING MOTOR SPEED BY ALTERING MAGNETIC FIELD OF THE MOTOR

BACKGROUND

1. Field of the Invention

The present invention generally relates to a system for controlling the speed of an electric motor.

2. Description of Related Art

Electric motors have been widely used in automotive applications. One common application using electric motors is an automotive fuel pump system. It is desirable to vary the amount of fuel provided from the fuel pump depending on the engine performance requirements. The amount of fuel delivered is dependent on the fuel pressure generated by the fuel pump. Generally, the fuel pressure is related to the speed of motor of the fuel pump. Typically most fuel pumps run at the highest pressure and maximum flow rate at all times to reduce the amount of fuel vapor for vehicle hot restart and provide sufficient fuel in a wide open throttle condition. However, running at the highest fuel pressure and flow is not efficient and negatively affects the life of the fuel pump.

One method used to vary motor speed to control fuel pressure uses a voltage drop resistor. The resistor is selectively connected to the motor voltage supply to control the voltage provided to the motor thereby changing the motor speed. Although this method reduces fuel pump wear, little energy is saved as the additional voltage is dissipated across the voltage drop resistor. Further, the additional heat energy created by the voltage drop resistor must be dissipated.

Another method used to vary motor speed thereby affecting fuel pressure includes modulating the driving signal. A pulse width modulator can be used to vary the duty cycle of the motor driving voltage thereby changing the motor speed. Although this method also reduces fuel pump wear and some energy is saved, the power and frequency of pulses required to drive the motor cause radio frequency interference problems for other vehicle components. Further, the use of a pulse width modulator in the control circuit increases system complexity and cost.

In view of the above, it is apparent that there exists a need for an improved system and method for controlling the speed of a motor.

SUMMARY

In satisfying the above need, as well as overcoming the enumerated drawbacks and other limitations of the related art, the present invention provides a system for controlling the speed of a motor by altering the magnetic field generated by the motor. The system includes a field modification module, and a motor having a rotor with field windings. The field windings are configured to receive a driving signal that generates a magnetic field causing a rotation of the rotor. The field modification module is proximate the motor and alters the magnetic field in response to an input signal thereby controlling the speed and torque of the rotor.

In another aspect of the present invention, the field modification module includes a coil and the coil is configured to receive a current to generate a flux that modifies the magnetic field thereby controlling the speed torque of the rotor. Further, the motor includes a flux carrier and the field modification module includes a return guide. The coil may be wrapped around the return guide where the return guide is connected to two sides of the flux carrier. Alternatively, the return guide and a flux carrier may cooperate to form a cavity and the coils may be located in the cavity between the flux carrier and the return guide.

In another aspect of the present invention, the field modification module includes a coil located inside the flux carrier. As previously discussed, the coil generates a flux to alter the magnetic field of the motor. The motor further includes magnets and the coil may be wrapped around the magnets, located adjacent to the magnets, located between the magnets, or embedded inside the magnets.

In another aspect of the present invention, the coil may be configured to generate a flux having a polarity matching the magnetic field thereby decreasing the speed of the motor. Alternatively, the coil may be configured to generate a flux having a polarity opposite the magnetic field thereby increasing speed of the motor.

In yet another aspect of the present invention, the motor includes a flux carrier having a thin portion configured to allow a disruption of the magnetic field. The field modification module includes a supplementary flux carrier and an actuator. The actuator is configured to move the supplementary flux carrier relative to the thin portion of the flux carrier. As a supplementary flux carrier moves closer to the flux carrier the disruption of the magnetic field is minimized thereby strengthening the magnetic field inside the motor. By strengthening the magnetic field inside the motor, the torque of the motor is increased while the speed of the motor is decreased.

Further objects, features and advantages of this invention will become readily apparent to persons skilled in the art after a review of the following description, with reference to the drawings and claims that are appended to and form a part of this specification.

DETAILED DESCRIPTION

Figure 1:
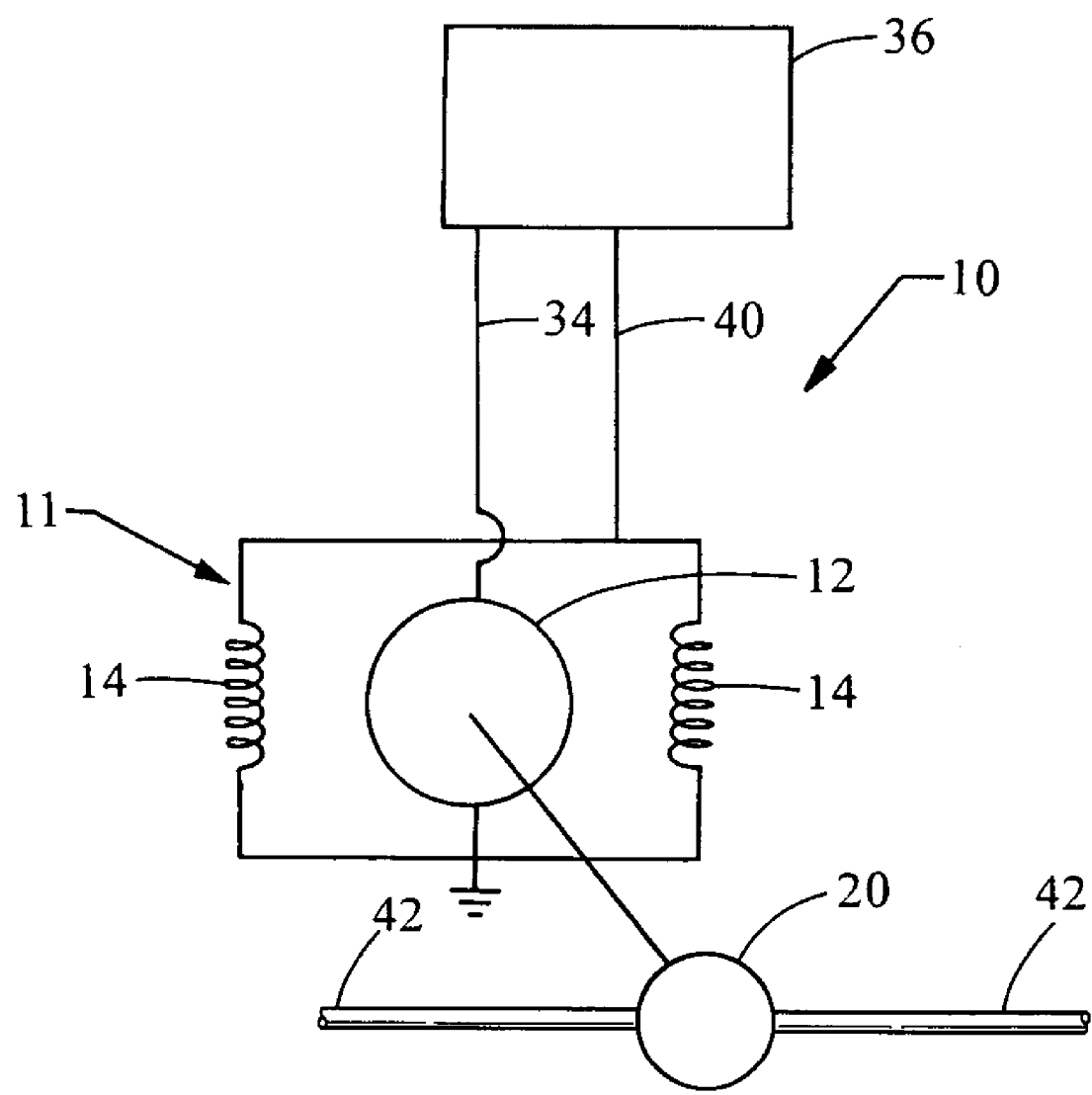
FIG. 1 is a block diagram of a system for controlling the speed of a motor in accordance with the present invention.

Referring now to FIG. 1, a system embodying the principles of the present invention is illustrated therein and designated at 10. The system 10 includes a field modification module (FMM) 11 coupled to a motor 12 where the FMM 11 is configured to alter a magnetic field to control the speed of the motor 12. The FMM 11 can be powered in series or in parallel with the motor 12.

The controller 36 provides a driving signal 34 to generate rotation of the motor 12. The driving signal 34 flows through the field windings of the motor 12 to create a magnetic field. The magnetic field creates a rotation of the motor 12 which is transferred to the pump assembly 20. The pump assembly 20 utilizes the rotation to draw fuel through the fuel lines 42. The faster the rotation the more pressure is created in the fuel lines 42. To control the speed of the motor 12, the controller 36 provides a control signal 40 to the FMM 11.

In this embodiment, the FMM 11 is shown as two coils 14 located proximate motor 12. Control signal 40 travels through the coils 14 and a magnetic flux is created altering the magnetic field driving the motor 12. The magnetic flux may be generated in the same polarity as the magnetic field generated by the motor 12, thereby increasing motor torque as the magnitude of the control signal 40 increases. Alternatively, the magnetic flux may be generated in the opposite polarity as the magnetic field generated by the motor 12, thereby increasing motor speed as the magnitude of the control signal increases. Based on the pressure generated from the motor 12 the fuel travels through the fuel lines 42.

Figure 2:
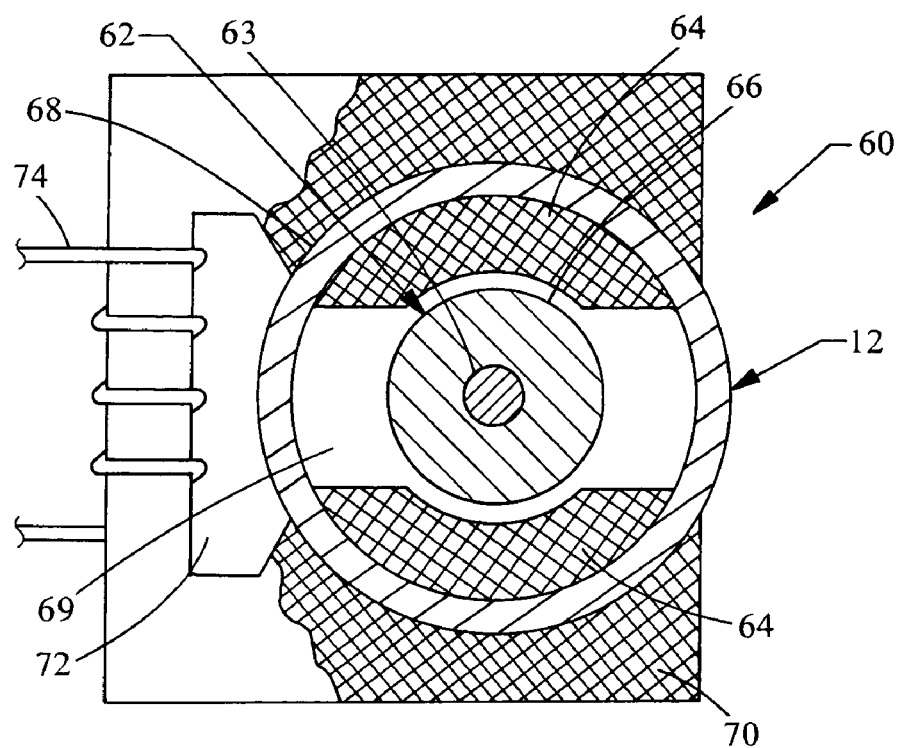
FIG. 2 is cross-sectional view of an embodiment of the system having external coil in accordance with present invention.

Now referring to FIG. 2, the system 60 is provided with the FMM 11 being external to the motor 12 in accordance with present invention. The motor 12 includes an armature 62, field windings 66, magnets 64 and a flux carrier 68. The armature 62 is configured to rotate and is located inside the flux carrier 68. The armature 62 has field windings 66 wrapped around portions of a rotor 63. As the driving signal 34 is provided to the field windings 66 a first magnetic flux is generated. The magnets 64 are located proximate the field winding 66 and generate a second magnetic flux. The first and second magnetic flux cooperate to form a magnetic field that causes a rotation of the armature 62. The flux carrier 68 encloses the magnets 64 and field windings 66 and directs the magnetic field around the motor 12 to complete the magnetic circuit. The strength of the magnetic field in the air gap 69 controls the speed and torque characteristics of the motor 12. By changing the magnitude of the magnetic field, the speed and torque characteristics of the motor 12 are also changed. Increasing the strength of the magnetic field will increase the torque at a given current through the armature 62. With all other variables held constant, the speed of the motor 12 will decrease. Alternatively, decreasing the strength of the magnetic field will increase the speed of the motor 12 and produce less torque with all other variables held constant.

A guide return 70 is attached to the flux carrier 68 at two ends. The coil 74 is wound around an opening 72 formed in the guide return 70 and acts as an electromagnet creating a third magnetic flux that travels through the guide return 70 and across the flux carrier 68 altering the magnetic field generated by the motor 12 as the magnetic field is returned through the flux carrier 68. Based on the winding direction coil 74 and the direction of current flow, the coil 74 can generate flux that has a polarity opposite the magnetic field thereby negating the magnetic field and causing the motor increase speed. Alternatively, the coil 74 can generate flux with a polarity matching the magnetic field thereby supplementing the magnetic field causing the motor to decrease speed and increase torque. Further, it is apparent from the above discussion that the FMM 11 can be applied to brushed or brushless motors.

Figure 3:
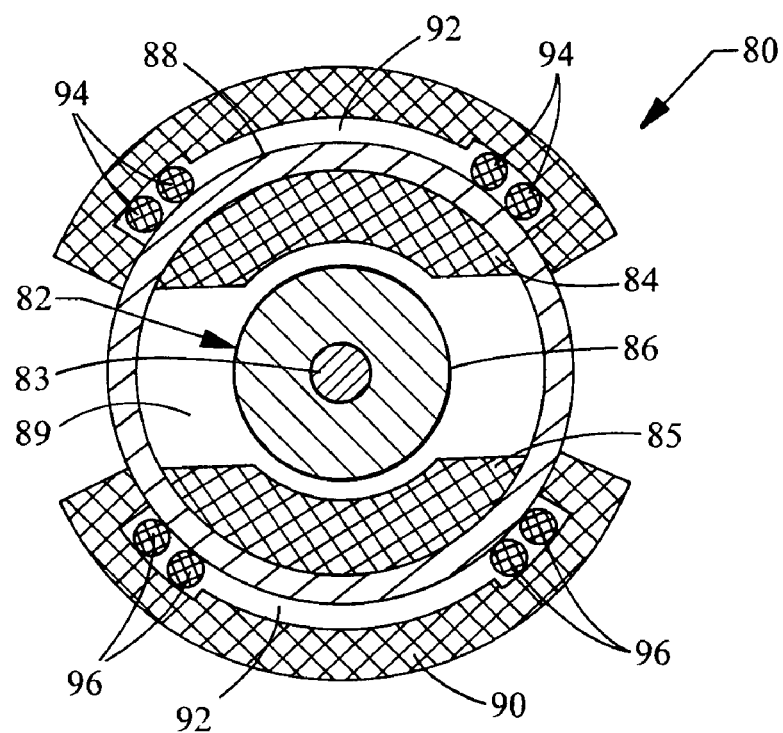
FIG. 3 is a cross-sectional view of an embodiment of the system having a coil between the flux carrier and return guide in accordance with present invention.

Now referring to FIG. 3, another embodiment of the system 80 is provided with the FMM 11 being external to the motor 12 in accordance with present invention. The motor 12 includes an armature 82, field windings 86, magnets 84 and 85, and a flux carrier 88. The armature 82 is configured to rotate and is located inside the flux carrier 88. The armature 82 has field windings 86 wrapped around portions of a rotor 83. As the control signal 40 is provided to the field windings 86, a first magnetic flux is generated. The magnets 84,85 are located proximate the field windings 86 and generate a second magnetic flux. The first and second magnetic flux cooperate to form a magnetic field that causes a rotation of the armature 82. The flux carrier 88 directs the magnetic field around the motor 12 to complete the magnetic circuit. The strength of the magnetic field in the air gap 89 controls the speed and torque characteristics of the motor 12. By changing the magnitude of the magnetic field, the speed and torque characteristics of the motor 12 are also changed.

The FMM 11 includes a first coil 94, a second coil 96, and guide returns 90. The guide returns 90 are attached to the flux carrier 88 at opposite ends. The guide returns 90 cooperate with the flux carrier 88 to form passages 92. A first and second coil 94, 96 are located in each of the passages 92. The first coil 94 generates a third magnetic flux that alters the magnetic field by the field windings 86 and the first magnet 84. Similarly, the second coil 96 generates a fourth magnetic flux that alters the magnetic field generated in cooperation with the second magnet 85. Based on the direction of the winding of the first and second coil 94, 96 and the direction of current flow, the first and second coil 94, 96 can generate flux that has a polarity opposite the magnetic field thereby negating the magnetic field and causing the motor to increase speed.

Figure 4:
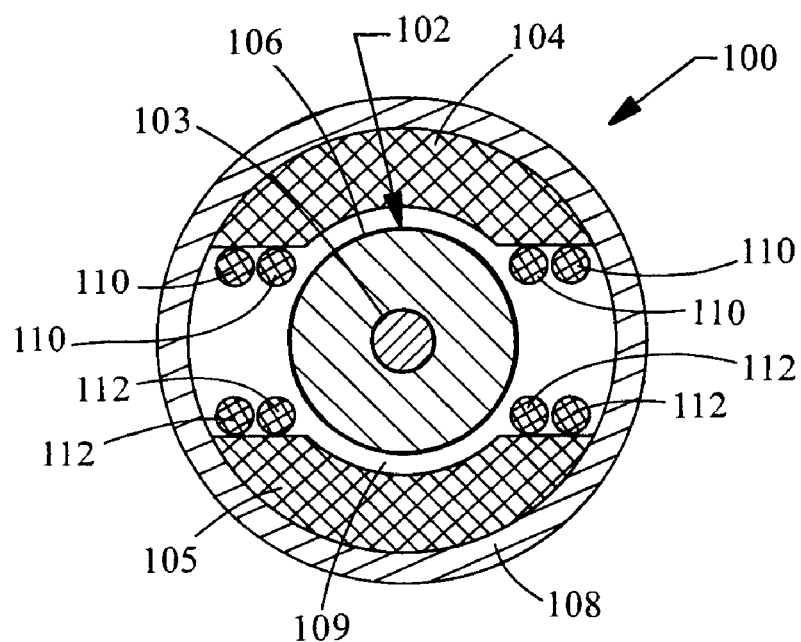
FIG. 4 is a cross-sectional view of an embodiment having a coil wrapped around the magnets of the motor in accordance with present invention.

Now referring to FIG. 4, another embodiment of the system 100 is provided with the FMM 11 being internal to the motor 12 in accordance with present invention. The motor 12 includes an armature 102, field windings 106, magnets 104 and 105, and a flux carrier 108. The armature 102 is configured to rotate and is located inside the flux carrier 108. The armature 102 has field windings 106 wrapped around portions of a rotor 103. As the control signal 40 is provided to the field windings 106 a first magnetic flux is generated. The magnets 104, 105 are located proximate the field windings 106 and generate a second magnetic flux. The first and second magnetic flux cooperate to form a magnetic field that causes a rotation of the armature 102. The flux carrier 88 directs the magnetic field around the motor 12 to complete the magnetic circuit. The strength of the magnetic field in the air gap 109 controls the speed and torque characteristics of the motor 12. By changing the magnitude of the magnetic field, the speed and torque characteristics of the motor 12 are also changed.

The FMM 11 includes a first coil 110, and a second coil 112. The first and second coil 110, 112 are located inside the flux carrier 108. The first coil 110 is wound around the first magnet 104 and generates a third magnetic flux that alters the magnetic field generated by the field windings 106 and the first magnet 104. Similarly, the second coil 112 is wound around the second magnet 105 and generates a fourth magnetic flux that alters the magnetic field generated in cooperation with the second magnet 105. Based on the direction of the winding of the first and second coil 110, 112 and the direction of current flow, the coil can generate flux that has a polarity opposite the magnetic field thereby negating the magnetic field and causing the motor to increase speed. Alternatively, the first and second coil 110, 112 can generate flux with a polarity matching the magnetic field thereby supplementing the magnetic field causing the motor to decrease speed and increase torque.

Figure 5:
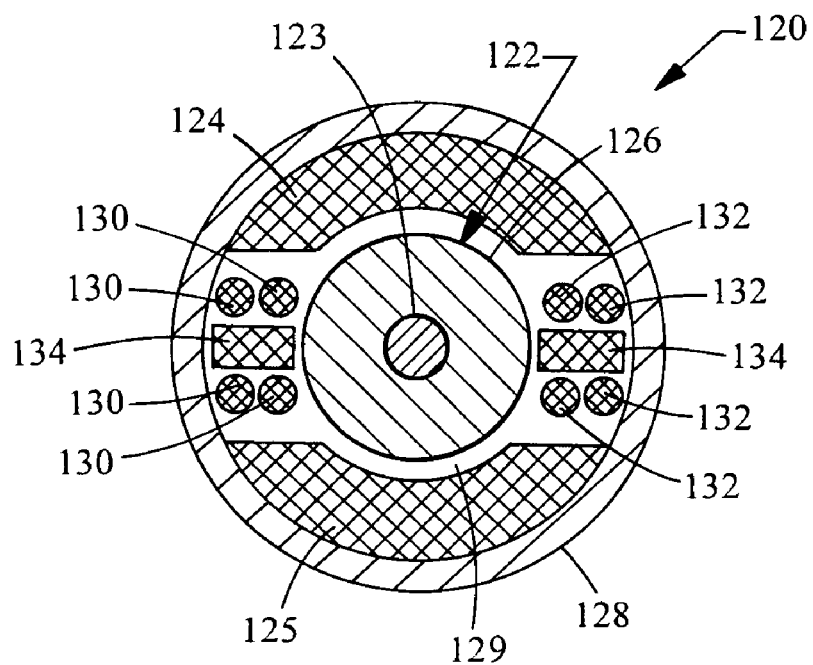
FIG. 5 is a cross-sectional view of an embodiment having a coil adjacent to the magnets of the motor in accordance with present invention.

Now referring to FIG. 5, another embodiment of the system 120 is provided with the FMM 11 being internal to the motor 12 in accordance with present invention. The motor 12 includes an armature 122, field windings 126, magnets 124 and 125, and a flux carrier 128. The armature 122 is configured to rotate and is located inside the flux carrier 128. The armature 122 has field windings 126 wrapped around portions of a rotor 123. As the control signal 40 is provided to the field windings 126 a first magnetic flux is generated. The magnets 124, 125 are located proximate the field windings 126 and generate a second magnetic flux. The first and second magnetic flux cooperate to form a magnetic field that causes a rotation of the armature 122. The flux carrier 128 directs the magnetic field around the motor 12 to complete the magnetic circuit. The strength of the magnetic field in the air gap 129 controls the speed and torque characteristics of the motor 12. By changing the magnitude of the magnetic field, the speed and torque characteristics of the motor 12 are also changed.

The FMM 11 includes a first coil 130, a second coil 132. Contained inside the flux carrier 128, the first and second coil 130, 132 are located adjacent to and between the first and second magnets 124, 125. The first and second coil 130, 132 generate a third magnetic flux that alters the magnetic field generated by the field windings 126 and the first and second magnet 124, 125. Based on the direction of the winding of the first and second coil 130, 132 and the direction of current flow, the first and second coil 130, 132 can generate flux that has a polarity opposite the magnetic field thereby negating the magnetic field and causing the motor to increase speed. Alternatively, the first and second coil 130, 132 can generate flux with a polarity matching the magnetic field thereby supplementing the magnetic field causing the motor to decrease speed and increase torque.

Figure 6:
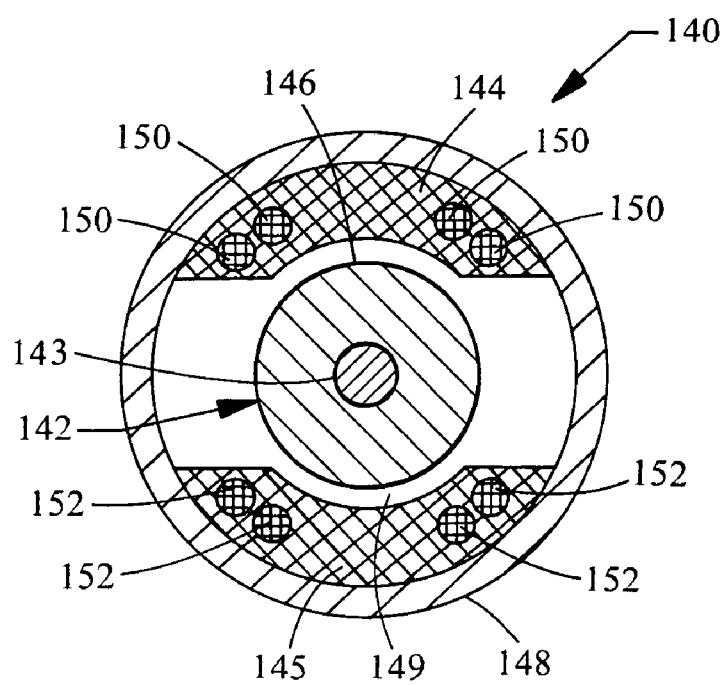
FIG. 6 is a cross-sectional view of an embodiment of having the coil embedded in the magnets of the motor in accordance with present invention.

Now referring to FIG. 6, another embodiment of the system 140 is provided with the FMM 11 being internal to the motor 12 in accordance with present invention. The motor 12 includes an armature 142, field windings 146, magnets 144 and 145, and a flux carrier 148. The armature 142 is configured to rotate and is located inside the flux carrier 148. The armature 142 has field windings 146 wrapped around a rotor 143. As the control signal 40 is provided to the field windings 146 a first magnetic flux is generated. The magnets 144, 145 are located proximate the field windings 146 and generate a second magnetic flux. The first and second magnetic flux cooperate to form a magnetic field that causes a rotation of the armature 142. The flux carrier 148 directs the magnetic field around the motor 12 to complete the magnetic circuit. The strength of the magnetic field in the air gap 149 controls the speed and torque characteristics of the motor 12. By changing the magnitude of the magnetic field, the speed and torque characteristics of the motor 12 are also changed.

The FMM 11 includes a first coil 150, a second coil 152. The first and second coil 150, 152 are located inside of the flux carrier 148. The first coil 150 is embedded in the first magnet 144 and generates a third magnetic flux that alters the magnetic field generated by the field windings 146 and the first magnet 144. Similarly, the second coil 152 is embedded in the second magnet 145 and generates a fourth magnetic flux that alters the magnetic field generated in cooperation with the second magnet 145. Based on the direction of the winding of the first and second coil 150, 152 and the direction of current flow, the coil can generate flux that has a polarity opposite the magnetic field thereby negating the magnetic field and causing the motor to increase speed. Alternatively, the first and second coil 150, 152 can generate flux with a polarity matching the magnetic field thereby supplementing the magnetic field causing the motor to decrease speed and increase torque.

Figure 7:
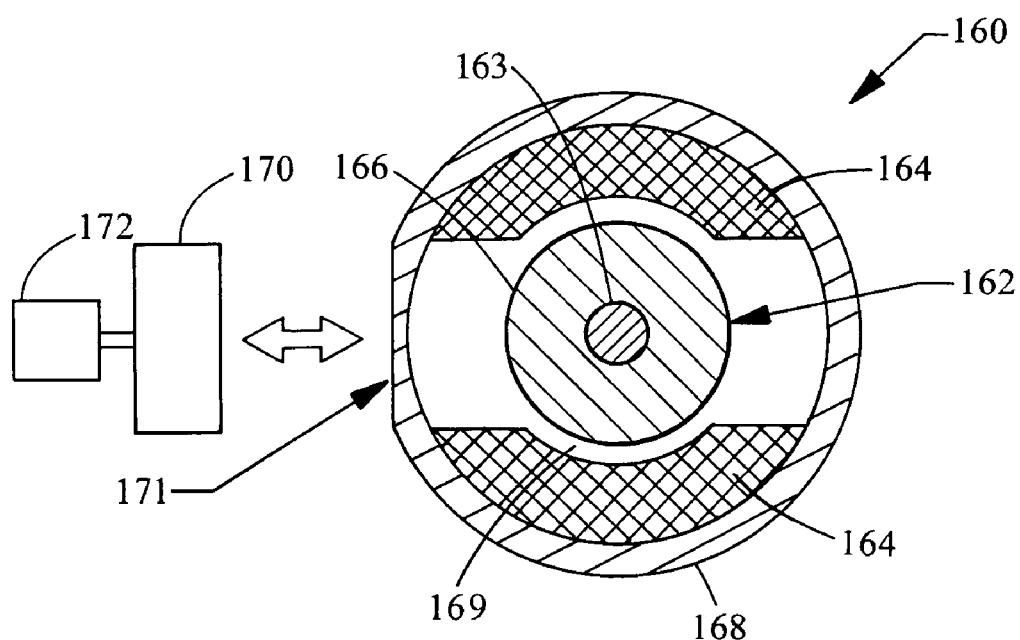
FIG. 7 is a cross-sectional view of an embodiment of a motor with a supplemental flux carrier in accordance with present invention.

Now referring to FIG. 7, another embodiment of the system 160 is provided with the FMM 11 being external to the motor 12 in accordance with present invention. The motor 12 includes an armature 162, field windings 166, magnets 164, and a flux carrier 168. The armature 162 is configured to rotate and is located inside the flux carrier 168. The armature 162 has field windings 166 wrapped around a rotor 163. As the control signal 40 is provided to the field windings 166 a first magnetic flux is generated. The magnets 164 are located proximate the field windings 166 and generate a second magnetic flux. The first and second magnetic flux cooperate to form a magnetic field that causes a rotation of the armature 162. The flux carrier 168 directs the magnetic field around the motor 12 to complete the magnetic circuit. The strength of the magnetic field in the air gap 169 controls the speed and torque characteristics of the motor 12. By changing the magnitude of the magnetic field, the speed and torque characteristics of the motor 12 are also changed.

The FMM 11 includes a supplementary flux carrier 170 and an actuator 172. The supplementary flux carrier 170 is located proximate to the flux carrier 168. The flux carrier 168 has a portion with a reduced thickness such that the magnetic field escapes through the thin portion 171 of the flux carrier 168. The actuator 172 is attached to the supplementary flux carrier 170 and is configured to move the supplementary flux carrier 170 relative to the thin portion 171 of the flux carrier 168. As the supplementary flux carrier 170 moves closer to the thin portion 171 of the flux carrier 168, the supplementary flux carrier 170 acts to contain the magnetic field thereby increasing the strength of the magnetic field inside the motor 12. Alternatively, as the supplementary flux carrier 170 moves away from the thin portion 171 of the flux carrier 168, more of the magnetic field escapes thereby decreasing the strength of the magnetic field inside the motor 12.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A system for controlling the speed of a motor, the system comprising:
   a motor having a field winding configured to receive a driving signal and generate a magnetic field causing a rotation of a rotor based on the driving signal;
   a field modification module proximate with the motor and configured to alter the magnetic field in response to an input signal thereby controlling the speed and torque of the rotor wherein the field modification module includes a coil and the coil is configured to receive the input to generate a flux that modifies the magnetic field thereby controlling the speed and torque of the rotor, wherein the motor includes a flux carrier extending around the field winding and the rotor to direct the magnetic field, wherein the motor includes a return guide extending from the flux carrier, and wherein the coil is located outside the flux carrier.

2. The system according to claim 1, wherein the coil is wrapped around a portion of the return guide.

3. The system according to claim 1 wherein the coil is located between the flux carrier and the return guide.

4. The system according to claim 3, wherein the return guide and the flux carrier cooperate to form a cavity and the coil is located inside the cavity.

5. A system for controlling the speed of a motor, the system comprising:
- a motor having a field winding configured to receive a driving signal and generate a magnetic field causing a rotation of a rotor based on the driving signal;
- a field modification module proximate with the motor and configured to alter the magnetic field in response to an input signal the speed and torque of the rotor, wherein the motor includes a flux carrier that has a thin portion configured to allow a disruption in the magnetic field, and the field modification module includes a supplementary flux carrier that is positioned proximate the thin portion of the flux carrier and a motion device coupled to the supplementary flux carrier wherein the supplementary flux carrier is movable in relation to the flux carrier thereby adjusting the disruption in the magnetic field.

6. The system according to claim 5, wherein the motion device is configured to move the supplementary flux carrier closer to the thin portion of the flux carrier thereby increasing the torque of the rotor.

7. A system for controlling the speed of a motor, the system comprising:
- a motor having a field winding configured to receive a driving signal and generate a magnetic field causing a rotation of a rotor based on the driving signal; and
- a field modification module includes a coil external with the motor and configured to receive an input signal to generate a flux that modifies the magnetic field thereby controlling the speed and torque of the rotor;
- wherein the motor includes a flux carrier and a return guide for the magnetic field, and the coil is located external to the flux carrier.

8. The system according to claim 7, wherein the coil is wrapped around a portion of the return guide.

9. The system according to claim 7, wherein the coil is located between the flux carrier and the return guide.

10. The system according to claim 9, wherein the return guide and the flux carrier cooperate to form a cavity and the coil is located inside the cavity.

11. A system for controlling the speed of a motor, the system comprising:
- a motor having a field winding configured to receive a driving signal and generate a magnetic field causing a rotation of a rotor based on the driving signal; and
- a field modification module proximate with the motor and configured to alter the magnetic field in response to an input signal thereby controlling the speed and torque of the rotor, wherein the motor includes a magnet located inside the flux carrier and the coil is located inside the magnet.

12. The system according to claim 11, wherein the coil is embedded in the magnet.

13. The system according to claim 7, wherein the coil is configured to receive a current to generate a flux having a polarity matching the magnetic field thereby decreasing the speed of the rotor.

14. The system according to claim 7, wherein the coil is configured to receive a current to generate a flux having a polarity opposite the magnetic field thereby increasing the speed of the rotor.

* * * * *